United States Patent
Hahm et al.

(10) Patent No.: US 7,492,865 B2
(45) Date of Patent: Feb. 17, 2009

(54) METHOD FOR GENERATING AT LEAST ONE OFFSET-CORRECTED X-RAY IMAGE

(75) Inventors: Gerhard Hahm, Erlangen (DE); Mathias Hörnig, Erlangen (DE); Martin Spahn, Chicago, IL (US)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/742,974

(22) Filed: May 1, 2007

(65) Prior Publication Data

US 2007/0291900 A1  Dec. 20, 2007

(30) Foreign Application Priority Data

May 5, 2006  (DE) .................. 10 2006 021 047

(51) Int. Cl.
*H05G 1/64* (2006.01)

(52) U.S. Cl. .................. 378/98.12; 378/98.8; 378/116

(58) Field of Classification Search .................. 378/91, 378/96, 98.8, 98.12, 114–116, 207; 250/370.08, 250/370.09, 370.11; 382/132
See application file for complete search history.

(56) References Cited

U.S. PATENT DOCUMENTS 7,302,039 B2 * 11/2007 Takenaka et al. ......... 378/98.12

2003/0223539 A1 * 12/2003 Granfors et al. ............ 378/98.8
2005/0063511 A1   3/2005 Hahm et al. ................. 378/91
2005/0151086 A1   7/2005 Spahn ................... 250/370.08
2005/0161610 A1   7/2005 Spahn ................... 250/370.09

FOREIGN PATENT DOCUMENTS

DE  10361397  7/2005
DE  102004003881  8/2005

* cited by examiner

*Primary Examiner*—Jurie Yun
(74) *Attorney, Agent, or Firm*—Baker Botts L.L.P.

(57) ABSTRACT

In flat-panel X-ray detectors which have a multiplicity of detector elements which are in each case associated with one pixel of an X-ray image, the individual detectors generate offset signals. These offset signals are detected by recording offset images in which there is no X-ray irradiation (dark images). The offset images are recorded after the X-ray images to be corrected in time. If for each X-ray image record, an associated offset image record is generated by using a single offset image or of two, the offset images can be recorded closely in time. Ghosting effects are then not disturbing because the offset images are only used for correcting the X-ray images which cause the ghosting.

20 Claims, 1 Drawing Sheet

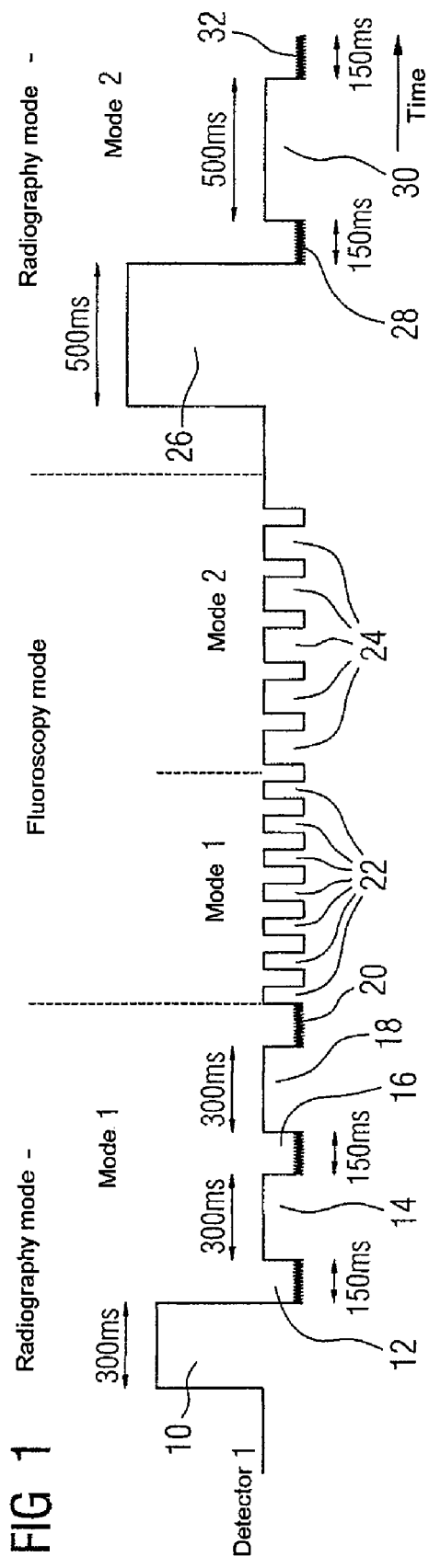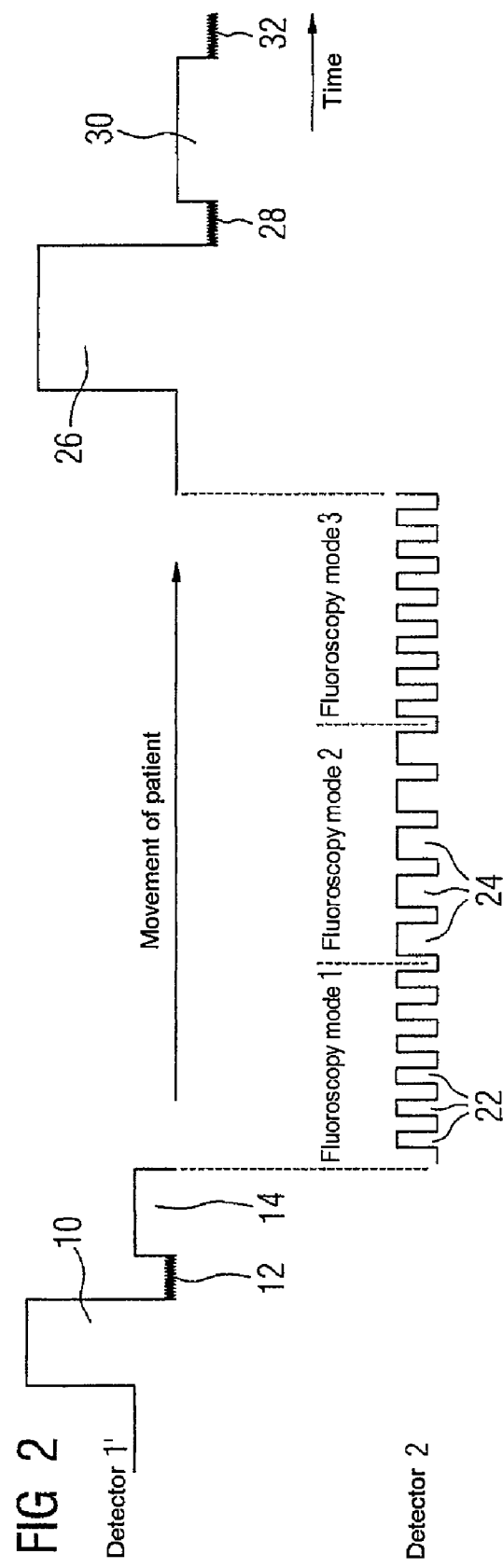

METHOD FOR GENERATING AT LEAST ONE OFFSET-CORRECTED X-RAY IMAGE

RELATED APPLICATION

This application claims priority from German Patent Application No. 10 2006 021 047.6, which was filed on May 5, 2006, and is incorporated herein by reference in its entirety.

TECHNICAL FIELD

The invention relates to a method for generating at least one offset-corrected X-ray image with the aid of a flat-panel X-ray detector.

BACKGROUND

In conventional systems, a single offset image record is usually used which, however, is regularly updated. The radiography mode differs from the fluoroscopy in that the irradiation periods can last several seconds and preferably individual images are recorded whereas in the fluoroscopy mode, a multiplicity of images is recorded at high frame rate with short irradiation times. In the radiography mode, too, several images are recorded successively, however. Between the recording of individual frames, it is then frequently not possible to update the offset image record. To update the offset image record, offset images must be recorded. There are so-called dark images. In the absence of X-ray irradiation, the flat-panel X-ray detector records image data as if an X-ray image were recorded. These offset images (dark images) then display the pixel-by-pixel offset generated by the detector elements of the flat-panel X-ray detector. During the recording of offset images, the image recording period should be exactly as long as in the case of the associated X-ray images to be corrected (bright images). In the case of image recording periods of several seconds, the radiologist recording the images can feel disturbed if an offset image is currently recorded and the radiography X-ray image cannot be recorded for a period of some seconds. In conventional systems, therefore, clever strategies have been developed of how and when the offset image record is updated.

For a purely radiographic system, an offset strategy is described in US 2005/0063511 A1. There are similar offset strategies also for fluoroscopic systems. More recent flat-panel X-ray detectors for universal applications allow the alternate production of a radiography mode and a fluoroscopy mode. Previous approaches involve the use of the offset strategies developed for the purely radiographic and purely fluoroscopic systems.

All previous strategies have in common that the offset image record is recorded before the X-ray image record to be corrected in each case in time. The reason given for this in conventional systems is that flat-panel X-ray detectors frequently exhibit so-called ghosting so that the ghost is in effect after the recording of an X-ray image. Since the offset image record is always used for a number of X-ray image records or correspondingly, offset image recordings are used for updating an offset image record which is used for a number of such X-ray image records, the ghost has a disturbing effect. In radiography, ghosts are effective for up to 15 seconds so that the offset images have hitherto been always recorded before the associated X-ray images for reasons of timing in conventional systems in the offset update strategies.

SUMMARY

A new strategy relating to the offset image record can be provided which is also suitable for the novel flat-panel X-ray detectors which can be used universally, or for arrangements of a number of X-ray detectors which are used alternately, wherein, in particular, the special features of such flat-panel X-ray detectors can be recognized and at the same time their capabilities can be utilized.

According to an embodiment, a method for generating at least one offset-corrected X-ray image with the aid of a flat-panel X-ray detector in a radiography mode of the flat-panel X-ray detector, may comprise generating at least one X-ray image record by using the flat-panel X-ray detector and X-ray irradiation of an object and thus of the flat-panel X-ray detector, wherein one image data value is allocated to individual pixels, respectively; generating, without X-ray irradiation, at least one offset image record by using the flat-panel X-ray detector, wherein one image data value is allocated to individual pixels, respectively; and for the respective X-ray image records, subtracting the image data values of the offset image record pixel by pixel from the image data values of the X-ray image record and, thus, generating offset-corrected image data values which form the image record of an offset-corrected X-ray image for the respective X-ray image record, wherein the offset image record used for the offset correction of an X-ray image record is in each case recorded after the respective X-ray image record in time.

BRIEF DESCRIPTION OF THE DRAWINGS

In the text which follows, embodiments are described with reference to the drawing, in which:

FIG. 1 diagrammatically shows the sequence in time of the steps carried out in an embodiment when using a universal flat-panel X-ray detector, and FIG. 2 shows the sequence in time of the steps in an embodiment by using two flat-panel X-ray detectors handling different tasks.

DETAILED DESCRIPTION

According to different embodiments, the offset image record used for the offset correction of an X-ray image record is in each case recorded after the respective X-ray image record in time. The embodiments, thus departs from the conventional idea that the offset image record is always recorded before the respective X-ray image record in time. This is facilitated by the readout times for the detectors, i.e. the time needed by the control for resolving the image data from the detector elements of the flat-panel X-ray detectors being shortened in novel flat-panel X-ray detectors. The embodiments overcome the preconceived idea that the ghost images are disadvantageous in the offset images.

The latter is successful especially when for each X-ray image record, an associated offset image record is generated and used during the offset correction. Since the ghost image only represents the contours which are imaged in any case in the X-ray image record, the presence of the ghost in the offset image record only leads to a small percentage of the image data values being subtracted in the area of the ghost which does no harm. It would be harmful if the ghost of a first X-ray image were used in the correction of a second X-ray image since it represents a different object than the first X-ray image.

This is prevented by the embodiment in that an associated offset image record is allocated to an X-ray image record (and preferably to a single X-ray image).

In an embodiment, the offset image record is here generated by exactly one offset image recording. In this embodiment, it is departed from the conventional approach of always recording a multiplicity of offset images and the use of complicated weightings of the image data values of the individual offset images for calculating the offset image record. Using only one offset image for generating the offset image record is facilitated by the fact that modern flat-panel X-ray detectors have increasingly less noise and, respectively, the electronic detector noise is negligible in comparison with the image noise at radiographic dose rates.

The offset image recording can be preferably carried out immediately after the reading out of all detector elements of the flat-panel X-ray detector during an X-ray image recording which is used for obtaining the X-ray image record. (The rule is here that the X-ray image recording is a single recording, i.e. that the X-ray image record is directly the set of image data generated during the X-ray image recording). In this case, recording the offset image is less disturbing in time: if the image recording period is 500 ms (which applies both to the X-ray image and to the offset image), a typical X-ray system requires approx. 1 s time for processing the images. If the time for recording the offset image is added to this one second, the one second is extended by less than one further second which is justifiable.

It may also be possible that two offset image recordings or more are used for generating the offset image record, preferably by pixel-by-pixel averaging of the individual offset image records of all (both) offset image recordings or, however, also by a weighting deviating from an averaging. This embodiment is facilitated especially when the X-ray window is small, i.e. the period of irradiation of the object with X-ray radiation during the X-ray image recording is shorter than 500 ms and preferably shorter than 350 ms or even than 300 ms or even than 250 ms. Since the image recording periods of the offset images correspond to the image recording period of an X-ray image to be corrected, according to standard, little time is then lost by the individual offset image recordings if the first offset image recording is begun immediately after the X-ray image recording (after the readout time for the detector elements has elapsed) (and subsequently the further offset image recordings are made in each case after the readout time for the predecessor offset image recordings has elapsed).

According to an embodiment, a development is allowed for the case where a flat-panel X-ray detector is used which can also be operated in a fluoroscopy mode. This analogously applies to the case where a further flat-panel X-ray detector is used which can be operated in a fluoroscopy mode, wherein such an arrangement can include that the first flat-panel X-ray detector operates exclusively in the radiography mode and the further flat-panel X-ray detector operates exclusively in the fluoroscopy mode. The development includes that in each case after conclusion of the image recordings required for a radiography X-ray image, in the present case therefore after the in each case last offset image recording used for generating the offset image record associated with the X-ray image record, the system is made ready for recording fluoroscopy images. In one case, the flat-panel X-ray detector would change automatically into fluoroscopy mode before the radiography mode. In the other case, the further flat-panel X-ray detector is activated. Readiness includes that at least one offset image record is generated for the fluoroscopy mode, i.e. in contrast to recording the offset images in radiography mode after the X-ray images to be corrected in time now before possible fluoroscopy recordings in time. The offset image record is repeatedly updated, preferably continuously updated, by offset image recordings. The updating of the offset image record by further offset image recordings is carried out in a manner known from conventional systems and thus in conventional manner, that is to say by including the image data of the in each case current offset image recording in the calculation of the previously applicable image record, possibly with omission of the inclusion of the image data of previously recorded offset images in the offset image record. The updating of the offset image record preferably ends when, triggered by a user, further X-ray image recordings are made, either in fluoroscopy mode—wherein the offset image record could then be used for the fluoroscopy mode—or in radiography mode—wherein the offset image record is possibly no longer used later. In the case of two flat-panel X-ray detectors being used, the offset image record is thus updated until X-ray image recordings are made by using the further flat-panel X-ray detector (that is to say in fluoroscopy mode) or until X-ray image recordings are made by using the first flat-panel X-ray detector, possibly after its reactivation, in radiography mode.

The step sequences shown in the figures include the recording of images with the aid of flat-panel X-ray detectors. A flat-panel X-ray detector comprises a multiplicity of detectors which in each case define one pixel. Recording an image means obtaining image data pixel by pixel. Both figures show the variation with time of the image recording. Each image recording is symbolized by a rectangular pulse, the absolute magnitude of which is unimportant. The only important factor is the difference between pulses of two different pulse amplitudes: a rectangular pulse with a higher pulse amplitude symbolizes the image recording under irradiation with X-ray radiation (bright image) and a smaller rectangular pulse symbolizes the image recording without X-ray radiation for obtaining an offset image (dark image).

Since the individual flat-panel X-ray detectors deliver a signal different from zero in the absence of X-ray irradiation, it is assumed that this basic signal is also contained in X-ray images as they are recorded. The basic signal (offset images) is therefore subtracted pixel by pixel from the image value of the X-ray image.

FIG. 1 illustrates the use of a single so-called universal flat-panel X-ray detector, i.e. of a flat-panel X-ray detector which can be operated both in a (or at least one) radiography mode and in a (or at least one) fluoroscopy mode. In the radiography mode, an X-ray image is first recorded (10). (The reference numbers basically designate rectangular symbols and it is not pointed out especially every time but the symbolized item is in each case specified in conjunction with the reference number).

In this context, it is assumed that the X-ray image recorded at 10 is used for generating an X-ray image record, i.e. that it is not so that a number of averaged X-ray images result in one X-ray image record. In the present case, the image data values of the X-ray image record are thus identical with the image data of a single X-ray image. The X-ray image recording 10 takes 300 ms (so-called X-ray window), during which the individual detectors are irradiated. Following this, the individual detectors must be read out pixel by pixel. During the readout time 12, which is 150 ms in modern flat-panel X-ray detectors, the signals are read out at the detector elements and detected as image data values by a (central) image processing system and stored. The end of the readout time is immediately followed by the recording 14 of a first offset image. The recording of the offset image again extends over a period of 300 ms so that the offset image (14) matches the X-ray image (10). The reason for this is that the offset signal, i.e. the basic signal delivered by the detector can easily be dependent on the recording period. The recording of an offset image 14 is followed by a readout time 16 which, naturally, is again 150 ms long. In principle, the first offset image could already be used for correcting offset in the X-ray image. Since in the present case, the image recording period (X-ray window) is only 300 ms and approx. 1 s must be reserved for the image processing, in any case, it makes almost no difference in time, however, if an additional image recording 18 of a second offset image is carried out with subsequent readout time 20. The first and the second recorded offset image are preferably used equivalently for generating an offset image record (i.e. the image data values are averaged pixel by pixel for generating an image data value of the offset image record). Using the offset image record thus obtained, the X-ray image record is then offset-corrected.

The detector could now remain simply in the radiography mode. In the representation according to FIG. 1, however, it automatically changes to the fluoroscopy mode after the readout time 20 has lapsed. The reason for this is that in fluoroscopy, the offset images cannot also be recorded after the images in time because due to the fact that the frame rates must be relatively high, there is not sufficient time available. In fluoroscopy mode, an offset image record is therefore still recorded before the recording of the associated X-ray images in time. By changing into fluoroscopy mode, the system makes itself ready, as it were, and generates preventatively offset image records. The recording 22 of a multiplicity of offset images in a first mode and the subsequent recordings 24 of further offset images in a second mode are shown. The two modes differ in the image recording periods and it is not necessary to specify any actual numerical values for the image recording periods in the present case. The seven offset images for mode 1 and the five offset images for mode 2 are then used in each case for obtaining an offset image record for the respective modes, using conventional calculation methods, e.g. simple averaging. A fluoroscopy image series could now be recorded both in mode 1 and in mode 2 because offset image records are available.

FIG. 1 shows a return to the radiography mode. For example, this return can be effected by user interaction. (In the simplest case, the radiologist pushes a button for recording a further X-ray image in radiography mode). The radiography mode shown here is a second mode in comparison with the mode with image recordings 10, 14, and 18 because the X-ray window has been enlarged. Thus, an X-ray image is recorded 26 with subsequent readout time 28. Here, too, the readout time 28 is directly followed by the recording 30 of an offset image with readout time 32 and here, too, the period of time during the recording of the offset image is equal to the period of time of the recording of the X-ray image, namely 500 ms. The recording of a second X-ray image is not illustrated. The reason for this is the longer image recording period (X-ray window of 500 ms). So that a further X-ray image can be recorded as soon as possible, a second offset image is not recorded here that the data of the first offset image are used directly for the offset image record and the recorded X-ray image (26) is then correspondingly offset-corrected.

This shows, therefore, that in radiography mode, at least one offset image (see 14 or 30, respectively) follows immediately after the readout time (12 or 28, respectively) after recording an X-ray image (see 10 or 26, respectively) has elapsed. Thus, a separate offset image record is generated for each X-ray image after the X-ray image has been recorded in time. In fluoroscopy mode, an offset image record is generated in conventional manner before the fluoroscopy image series are recorded.

According to an embodiment, the principles described can also be applied when using arrangements of conventional flat-panel X-ray detectors. It is thus not obligatory that the flat-panel X-ray detector can change from a radiography mode into a fluoroscopy mode. In arrangements in which a first flat-panel X-ray detector is provided which is used for radiography, and a second flat-panel X-ray detector is provided which is used for fluoroscopy, the time sequence from FIG. 1 can also be used, however, in an only slightly modified form: as illustrated by the identification by reference numbers in FIG. 2, the steps which previously took place in radiography mode can take place at a first detector (detector 1') and the steps which previously took place in fluoroscopy mode can take place in a second detector (detector 2). Instead of a detector then changing from a radiography mode into a fluoroscopy mode (as in FIG. 1), a change between detectors 1' and 2 must now take place. This requires a data link between the two detectors 1' and 2. For example, it can be provided in any case that the image data of the two detectors are processed by the same image processing system. In the case where two separate image processing systems are available, the coupling must be ensured via another data link.

Thus, for example when moving a patient, this coupling is used, after conclusion of the X-ray recording and the recording of the associated offset image (detector 1), for automatically generating one or more series of offset images on the other system 2 which has previously been inactive. This process ends either after completion of the recording or it is interrupted by a new recording request of the detector 1. FIG. 2 shows that only one offset image 14 is recorded (the periods of time designated in FIG. 1 do not necessarily need to apply to the case of FIG. 2). FIG. 2 shows that the second flat-panel X-ray detector (detector 2) passes through three fluoroscopy modes, wherein the difference from FIG. 1, in which only two modes are shown, should only illustrate that the changeover between detectors is particularly appropriate if there are long times available which is the case, for example, during the said movement of a patient. The fact that relatively long times are available can also result from the fact, not shown, that a minimum time has elapsed, e.g. 10 seconds have elapsed, since the recording of the last offset image.

In the case where the two detectors 1' and 2 are arranged in a common X-ray system, the principles described still apply inasmuch that the offset images 14 are recorded after the X-ray images 10 in radiography mode so that the detector 1' operates according to an embodiment and must accordingly have a drive arrangement according to an embodiment. In comparison with conventional detectors which are used for recording fluoroscopy image series, there do not need to be many changes in the detector 2 or in its drive arrangement as long as the coupling to the detector 1' is ensured: This is because switching between the two detectors is an aspect according to an embodiment, as shown here.

What is claimed is:

1. A method for generating at least one offset-corrected X-ray image with the aid of a flat-panel X-ray detector being operable in a radiography mode and in a fluoroscopy mode, wherein, in the radiography mode of the flat-panel X-ray detector, the method comprises:

generating at least one X-ray image record by using the flat-panel X-ray detector and X-ray irradiation of an object and thus of the flat-panel X-ray detector, wherein one image data value is allocated to individual pixels, respectively, generating, without X-ray irradiation, at least one offset image record by using the flat-panel X-ray detector, wherein one image data value is allocated to individual pixels, respectively, and for the respective X-ray image records, subtracting the image data values of the offset image record pixel by pixel from the image data values of the X-ray image record and, thus, generating offset-corrected image data values which form the image record of an offset-corrected X-ray image for the respective X-ray image record, wherein the offset image record used for the offset correction of an X-ray image record is in each case recorded after the respective X-ray image record in time, wherein after a respective last offset image recording used for generating the offset image record associated with the X-ray image record, the method comprises:

changing the system automatically into fluoroscopy mode, and generating at least one offset image record for the fluoroscopy record which is repeatedly updated by offset image recordings until, triggered by a user, a further X-ray image recording is made, either in fluoroscopy mode or in radiography mode.

2. The method according to claim 1, wherein for each X-ray image record, an associated offset image record is generated and used during the offset correction.

3. The method according to claim 2, wherein the offset image record is generated by exactly one offset image recording.

4. The method according to claim 3, wherein the offset image recording is carried out immediately after the reading-out of all detector elements of the flat-panel X-ray detector during an X-ray image recording which is used for obtaining the X-ray image record.

5. The method according to claim 2, wherein the offset image record is generated by at least two offset image recordings.

6. The method according to claim 2, wherein the offset image record is generated by averaging the individual offset image data values of all offset image recordings pixel by pixel.

7. The method according to claim 2, wherein the first one of the offset image recordings is carried out immediately after the reading-out of the detector elements of the flat-panel X-ray detector during an X-ray image recording, which is used for obtaining the X-ray image record, wherein the period of irradiation of the object with X-ray radiation during the X-ray image recording is shorter than 500 ms.

8. The method according to claim 7, wherein the period of irradiation of the object with X-ray radiation during the X-ray image recording is shorter than 300 ms.

9. The method according to claim 1, wherein in fluoroscopy mode, a plurality of set of offset images is recorded, wherein each set has a different exposure length.

10. A method for generating at least one offset-corrected X-ray image with the aid of a first flat-panel X-ray detector being operable in a radiography mode and a second flat-panel X-ray detector being operable in a fluoroscopy mode, wherein, in a the radiography mode, the method comprises:

generating at least one X-ray image record by using the first flat-panel X-ray detector and X-ray irradiation of an object and thus of the first flat-panel X-ray detector, wherein one image data value is allocated to individual pixels, respectively, generating, without X-ray irradiation, at least one offset image record by using the first flat-panel X-ray detector, wherein one image data value is allocated to individual pixels, respectively, and for the respective X-ray image records, subtracting the image data values of the offset image record pixel by pixel from the image data values of the X-ray image record and, thus, generating offset-corrected image data values which form the image record of an offset-corrected X-ray image for the respective X-ray image record, wherein the offset image record used for the offset correction of an X-ray image record is in each case recorded after the respective X-ray image record in time, and wherein in a fluoroscopy mode, wherein after a respective last offset image recording used for generating the offset image record belonging to the X-ray image record, the method comprises:

activating the second flat-panel X-ray detector, and generating at least one offset image record for the fluoroscopy record which is repeatedly updated by offset image recordings.

11. The method according to claim 10, wherein the fluoroscopy record is repeatedly updated by offset image recordings until, triggered by a user, a further X-ray image is recorded by using the second flat-panel X-ray detector or, in radiography mode, by using the first flat-panel X-ray detector.

12. A method for generating at least one offset-corrected X-ray image with the aid of at least one flat-panel X-ray detector wherein, in a radiography mode, the method comprises:

generating an X-ray image record by using the flat-panel X-ray detector and X-ray irradiation of an object and thus of the flat-panel X-ray detector, wherein one image data value is allocated to individual pixels, respectively, subsequently generating, without X-ray irradiation, at least one offset image record by using the flat-panel X-ray detector, wherein one image data value is allocated to individual pixels, respectively, and for the respective X-ray image records, subtracting pixel by pixel the image data values of the offset image record from the image data values of the X-ray image record and, thus, generating offset-corrected image data values which form the image record of an offset-corrected X-ray image for the respective X-ray image record, and wherein after a respective last offset image recording used for generating the offset image record associated with the X-ray image record, the steps of:

changing the system automatically into a fluoroscopy mode, and generating at least one offset image record for the fluoroscopy record which is repeatedly updated by offset image recordings until, triggered by a user, a further X-ray image recording is made, either in fluoroscopy mode or in radiography mode.

13. The method according to claim 12, wherein the offset image record is generated by exactly one offset image recording.

14. The method according to claim 13, wherein the offset image recording is carried out immediately after the reading-out of all detector elements of the flat-panel X-ray detector during an X-ray image recording which is used for obtaining the X-ray image record.

15. The method according to claim 13, wherein first flat-panel X-ray detector operable in the radiography mode is provided, and a second flat-panel X-ray detector is provided operable in a fluoroscopy mode, wherein after a respective last offset image recording used for generating the offset image record belonging to the X-ray image record, the method comprises:

activating the second flat-panel X-ray detector, and generating at least one offset image record for the fluoroscopy record which is repeatedly updated by offset image recordings.

16. The method according to claim 15, wherein the fluoroscopy record is repeatedly updated by offset image recordings until, triggered by a user, a further X-ray image is recorded by using the second flat-panel X-ray detector or, in radiography mode, by using the first flat-panel X-ray detector.

17. The method according to claim 12, wherein the offset image record is generated by at least two offset image recordings.

18. The method according to claim 12, wherein the offset image record is generated by averaging the individual offset image data values of all offset image recordings pixel by pixel.

19. The method according to claim 12, wherein a first one of the offset image recordings is carried out immediately after the reading-out of the detector elements of the flat-panel X-ray detector during an X-ray image recording, which is used for obtaining the X-ray image record, wherein the period of irradiation of the object with X-ray radiation during the X-ray image recording is shorter than 500 ms or shorter than 300 ms.

20. The method according to claim 12, wherein in fluoroscopy mode, a plurality of set of offset images is recorded, wherein each set has a different exposure length.

* * * * *